(12) United States Patent  
Shih et al.

(10) Patent No.: US 8,816,532 B2  
(45) Date of Patent: Aug. 26, 2014

(54) REDUNDANT POWER SYSTEM

(75) Inventors: Tsun-Te Shih, New Taipei (TW);
Yu-Yuan Chang, New Taipei (TW);
Li-Wei Lu, New Taipei (TW);
Heng-Chia Chang, New Taipei (TW);
Jui-Hao Pan, New Taipei (TW)

(73) Assignee: Zippy Technology Corporation, New Taipei (TW)

( * ) Notice: Subject to any disclaimer, the term of this patent is extended or adjusted under 35 U.S.C. 154(b) by 559 days.

(21) Appl. No.: 13/218,939

(22) Filed: Aug. 26, 2011

(65) Prior Publication Data

US 2013/0049463 A1 Feb. 28, 2013

(51) Int. Cl.
*H02J 1/10* (2006.01)

(52) U.S. Cl.
USPC .......................................................... 307/43

(58) Field of Classification Search
USPC .......................................................... 307/43
See application file for complete search history.

(56) References Cited

FOREIGN PATENT DOCUMENTS

| TW | M307787 | 8/2006 |
|---|---|---|
| TW | M381826 | 12/2009 |
| TW | I331714 | 10/2010 |

*Primary Examiner* — Robert L. DeBeradinis
(74) *Attorney, Agent, or Firm* — Muncy, Geissler, Olds & Lowe, P.C.

(57) ABSTRACT

A redundant power system aims to provide multiple main output power and multiple standby power to drive a plurality of loads operating in an operating mode or a standby mode. The redundant power system includes a plurality of power supplies and a back panel. Each power supply provides a main output power and a standby power. The back panel has a power bus path to converge the main output power. The power bus path is divided into multiple main power output paths each being controlled by a remote ON/OFF switch to determine whether to perform output, and multiple standby power output paths each has a conversion unit located thereon. The conversion unit converts the power in the power bus path and provides a simulated standby power to the loads in a normal.

6 Claims, 2 Drawing Sheets

REDUNDANT POWER SYSTEM

FIELD OF THE INVENTION

The present invention relates to a redundant power system and particularly to an improved redundant power system to provide main output power from power supplies to meet standby requirement of loads.

BACKGROUND OF THE INVENTION

Redundant power systems are frequently being used to provide steady power for long duration of operation of large systems such as databases and servers. For instance, R.O.C. patent No. M381826 entitled "Redundant power supply apparatus" discloses a power supply apparatus that includes a casing, a back panel, a plurality of power supplies and at least one power input module. The casing has at least one power input housing compartment and a plurality of power output housing compartments. The power input module is held in the power input housing compartment and the power supplies are held in the power output housing compartments. The power input module and power supplies are electrically connected to the back panel. The power input module also is connected to an external power source to receive electric power for the power supplies. Because of multiple power supplies are provided, in the event that one or more of the power supplies malfunction power supply can be maintained without interruption.

R.O.C. patent No. M307787 entitled "Removable composite redundant power system" discloses another type of redundant power system which includes a host holder partitioned into a plurality of main removable compartments, at least one power unit and a plurality of power supplies. The main removable compartments have an inner side with a main power distribution unit located thereon. The power unit has a sub-holder partitioned into a plurality of sub-removable compartments to house the power supplies to form one power unit. Each main removable compartment can hold one power unit. The power units held in the host holder are electrically connected to the main power distribution unit. Each power unit has multiple sets of power supplies. Hence the host holder can continuously provide power in the event that one or more power supplies malfunction.

However, loads supporting remote ON/OFF often have a standby mode. The redundant power system has to provide standby power to the load having the standby mode. R.O.C. patent No. I331714 entitled "Redundant power supply system" discloses a redundant power system supporting the standby mode. It includes a plurality of power supplies each has a standby power unit and a main power unit. The standby power unit continuously outputs power to loads at the power supply standby state so that the loads are waiting to be started at the standby state. It also provides a first power balance unit and a second power balance unit that are connected to the standby power unit and main power unit of a plurality of power supplies to regulate output of two power supplies to achieve a balanced and higher efficiency.

The aforesaid conventional techniques converge power of multiple power supplies and regulate output according to load requirements via a balance circuit, or commonly called a back panel. Please referring to FIG. 1, a back panel 92 is connected to a plurality of power supplies 91. Each power supply 91 provides a main output power 911 and a standby power 912 to the back panel 92 as input. The back panel 92 has a main power bus 921 to converge currents of all the main output power 911, and determines whether the power is sent to loads 941, 942, 943 and 944 at the rear end via remote ON/OFF function of a plurality of starting switches 931, 932, 933 and 934. Similarly, the standby power 912 provided by the power supplies 91 also is converged to a standby power bus 922 of the back panel 92 and directly output to the loads 941, 942, 943 and 944 at the rear end. As the loads 941, 942, 943 and 944 require the standby power 912 whether at the standby or start state, they do not need remote ON/OFF switches.

In practice the architecture shown in FIG. 1 often encounters a problem of inadequate standby power 912. Although output watt of the power supplies 91 increases constantly, it mainly increases output current of the main output power 911 while the rated output current of the standby power 912 remains unchanged. When the standby power required by the loads 941, 942, 943 and 944 connected to the back panel 92 exceeds the capacity of the standby power 912 provided by the power supplies 91, the loads 941, 942, 943 and 944 cannot operate normally. Furthermore, although the capacity of main output power of the power supplies 91 can drive the loads 941, 942, 943 and 944 at the rear end of the back panel 92, and theoretically malfunction or idled for repairs and maintenance of one or more of the power supplies 91 is allowed, due to the loads 941, 942, 943 and 944 are numerous, partial shutdown or malfunction of the power supplies 91 often causes insufficient supply of the standby power 912, and results in abnormal operation of the loads 941, 942, 943 and 944.

Thus inadequacy of standby power limits the number of loads supportable by the power system.

SUMMARY OF THE INVENTION

In view of inadequate standby power limits the number of loads supportable by a conventional power system the primary object of the present invention is to solve the aforesaid disadvantage by providing standby power with sufficient current.

The present invention aims to provide a redundant power system that supplies multiple main output power and multiple standby power to drive a plurality of loads in an operating mode or a standby mode. The redundant power system includes a plurality of power supplies and a back panel. Each power supply provides a main output power and a standby power. The back panel has a power bus path to converge the main output power. The power bus path is further divided into multiple main power output paths each being controlled by a remote ON/OFF switch to control output, and multiple standby power output paths each has a conversion unit located thereon. The conversion unit converts the power in the power bus path and provides a simulated standby power to the loads in the normal condition.

More specifically, at least one of the power supplies is set in an operating mode to provide the main output power. The redundant power system further includes a power source control unit which receives the standby power from the power supplies and determines whether each power supply malfunctions so that at least one of the power supplies can provide the main output power. The main output power and simulated standby power have different voltage levels.

In another aspect the power source control unit can be installed on the back panel to form a control signal path with each power supply. The power source unit can send a control signal via the control signal path to drive the power supply to start providing the main output power.

By means of the features set forth above the main output power converged on the power bus path can be converted through the conversion unit to the simulated standby power supplied to each load at the standby state as required, and by starting merely at least one power supply can provide the main output power to supply all the loads at the standby state without all the power supplies to output the standby power simultaneously. As a result, use loss of the power supplies can be reduced.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
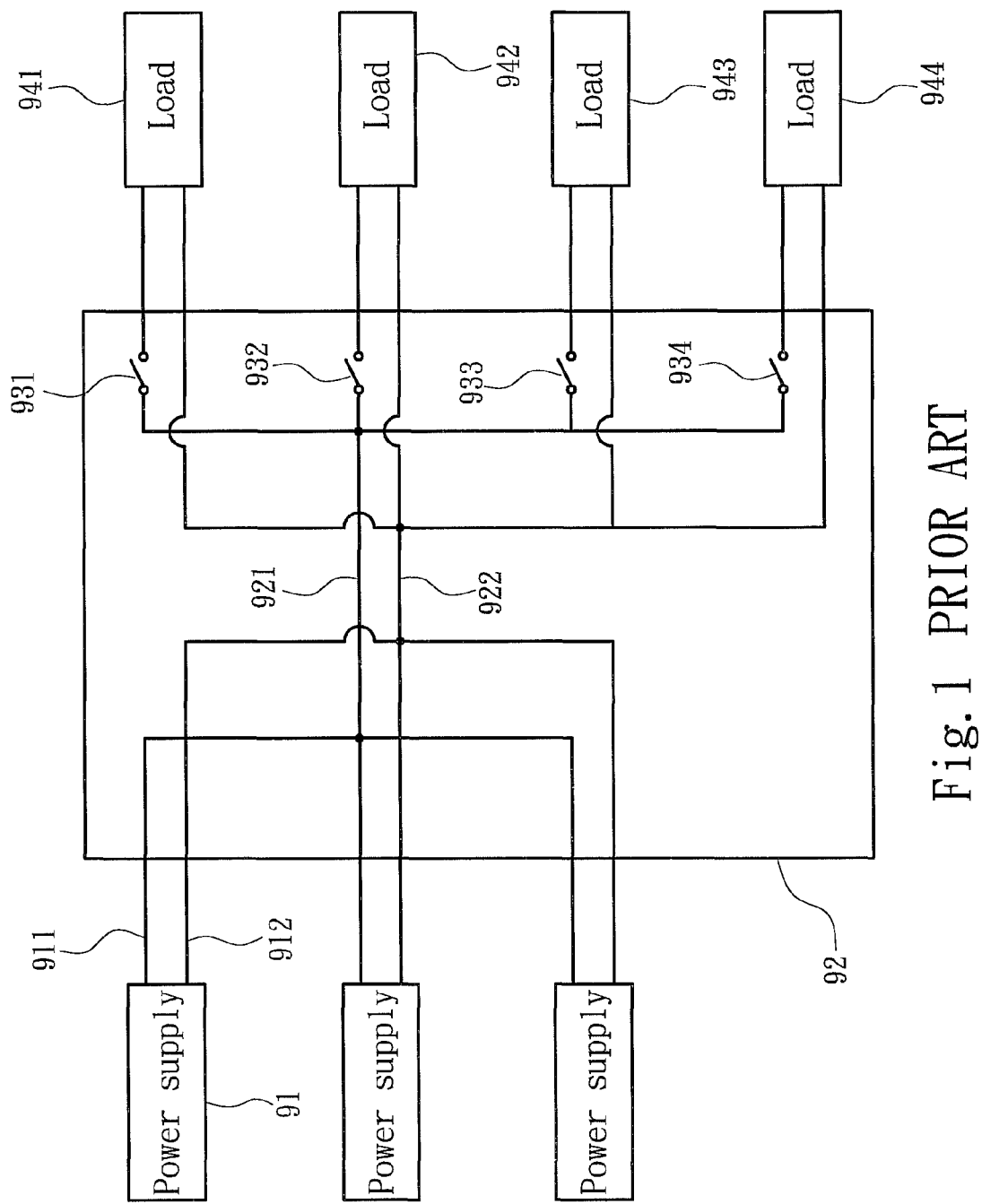
FIG. 1 is a schematic view of a conventional redundant power system.
Figure 2:
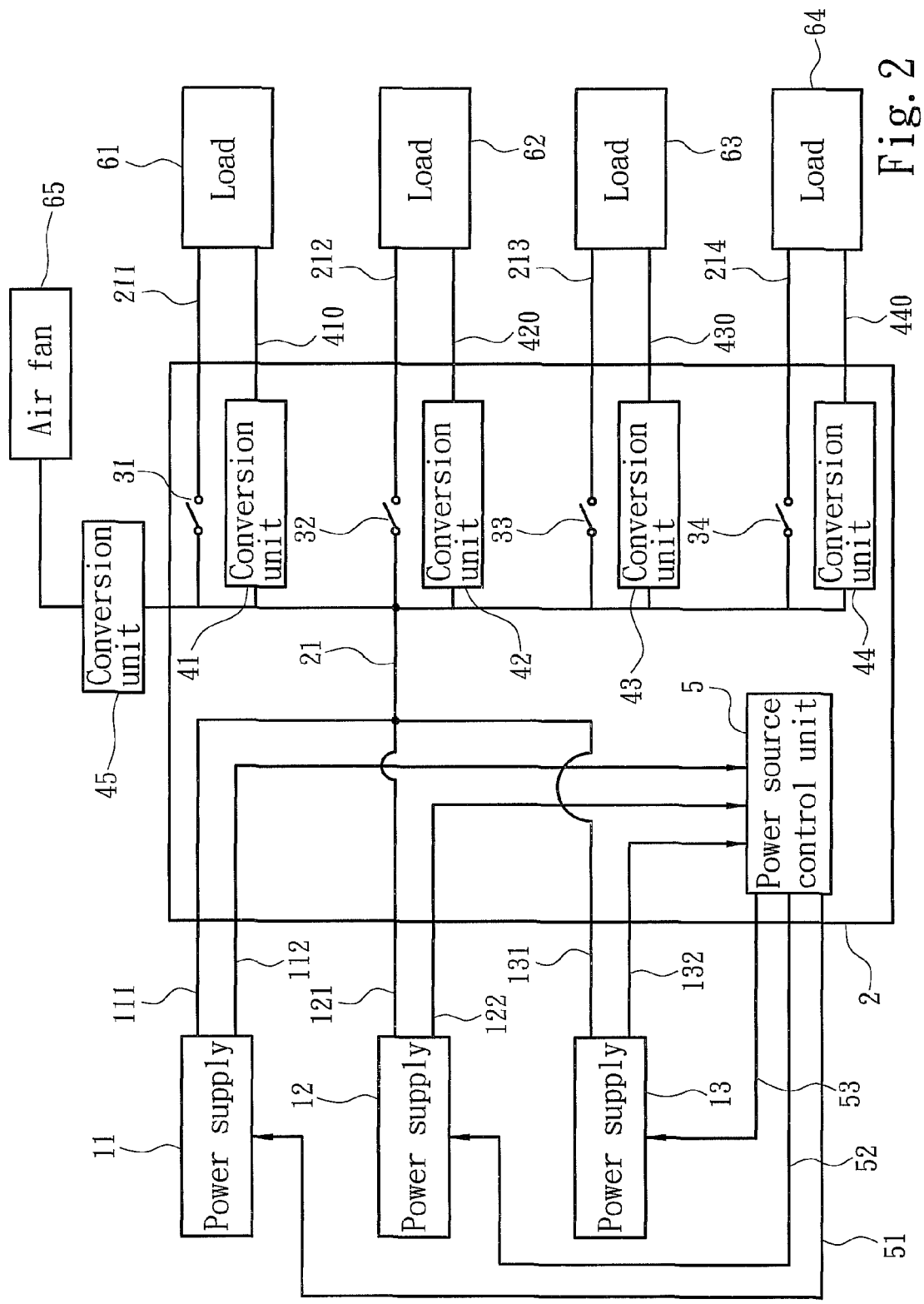
FIG. 2 is a schematic view of the redundant power system of the invention.

Please referring to FIG. 2, the redundant power system according to the invention includes a plurality of power supplies 11, 12 and 13, and a back panel 2. The power supplies 11, 12 and 13 respectively provide a standby power in a standby mode or an operating mode via standby power paths 112, 122 and 132. The power supplies 11, 12 and 13 also output main output power via main power paths 111, 121 and 131. The main power paths 111, 121 and 131 are connected to the back panel 2. Moreover, at least one of the power supplies 11, 12 and 13 is maintained in the operating mode to provide the main output power, the reason for this will be discussed later. The back panel 2 receives the main output power from the power supplies 11, 12 and 13 via the main power paths 111, 121 and 131. The back panel 2 also has a power bus path 21 to converge the main output power. The power bus path 21 is divided into a plurality of main power output paths 211, 212, 213 and 214 and a plurality of standby power output paths 410, 420, 430 and 440 that have respectively a conversion unit 41, 42, 43 and 44 located thereon. The main power output paths 211, 212, 213 and 214 and the power bus path 21 are bridged respectively by a remote ON/OFF switch 31, 32, 33 and 34. ON or OFF of the remote ON/OFF switches 31, 32, 33 and 34 determines whether the main power output paths 211, 212, 213 and 214 can channel current from the power bus path 21 for output. The power bus path 21 requires power converted by the conversion units 41, 42, 43 and 44 to output via the standby power output paths 410, 420, 430 and 440. The conversion units 41, 42, 43 and 44 convert the power in the power bus path 21 and provide a simulated standby power in a normal condition. The main output power and simulated standby power on the power bus path 21 have different voltage levels. The main power output paths 211, 212, 213 and 214 and standby power output paths 410, 420, 430 and 440 can be connected to a plurality of loads 61, 62, 63 and 64 such that the loads 61, 62, 63 and 64 can receive the simulated standby power to enter the standby mode, or receive the main output power to enter the operating mode. In practice, the main output power of the power supplies 11, 12 and 13 has a set voltage of 12V and is converged on the power bus path 21. The conversion units 41, 42, 43 and 44 convert the main output power to the simulated standby power of 5V so that the loads 61, 62, 63 and 64 receive the simulated standby power and enter the standby mode. The invention lets at least one of the power supplies 11, 12 and 13 maintain in the operating mode to provide the main output power, thus the conversion units 41, 42, 43 and 44 can receive the main output power in the normal condition and convert to the simulated standby power to be output in the normal condition.

In the embodiment shown in FIG. 2, the back panel 2 is electrically connected to the loads 61, 62, 63 and 64. In the event that the loads 61, 62, 63 and 64 are all at the standby state start only one power supply 11 can output the main output power, then through the conversion units 41, 42, 43 and 44 the simulated standby power can be provided respectively to the loads 61, 62, 63 and 64. Because the main output power from one set of the power supply 11 can support standby requirement of the loads 61, 62, 63 and 64, operation loss of the power supplies 12 and 13 can be reduced. Moreover, since output of the power supply 11 can meet standby requirement of the loads 61, 62, 63 and 64, the number of loads is not limited due to insufficient standby power of the redundant power system. When the loads 61, 62, 63 and 64 are started by users the remote ON/OFF switches 31, 32, 33 and 34 are triggered and set ON by the users, then the power supplies 12 and 13 can be started according to power requirement to output power required. In addition, the power bus path 21 is further connected to a conversion unit 45 which has a rear end electrically connected to an air fan 65. The conversion unit 45 receives power from the power bus path 21 and converts to power required by the air fan 65 in operation to meet system cooling requirement.

Referring to FIG. 2, the redundant power system may further include a power source control unit 5 connected to the standby power paths 112, 122 and 132 of the power supplies 11, 12 and 13 to receive the standby power output therefrom and determine whether malfunction occurs to the power supplies 11, 12 and 13. The power source control unit 5 can be selectively installed on the back panel 2 or independently from the back panel 2. The power source control unit 5 and the power supplies 11, 12 and 13 are bridged by control signal paths 51, 52 and 53 through which a control signal is sent to drive the power supplies 11, 12 and 13 to enter the operating mode to provide the main output power. The power source control unit 5 aims to ensure that at least one of the power supplies 11, 12 and 13 is maintained in the operating mode to provide the main output power. Hence the power source control unit 5 must determine whether at least one of the power supplies 11, 12 and 13 is in steady operation, and in the event that malfunction occurs to any one of the power supplies 11, 12 and 13 that is in operation, another one thereof is started to continuously provide the main output power.

By means of the features set forth above, the main output power converged to the power bus path can be converted via the conversion units to become the simulated standby power for each load. As the main output power is sufficient to meet the standby power requirement of all loads at the standby state, starting minimum one power supply can provide the main output power to support standby requirement of all the loads without all the power supplies to output the standby power at the same time, hence use loss of the power supplies can be reduced.

While the invention has been described by means of specific embodiments, numerous modifications and variations could be made thereto by those skilled in the art without departing from the scope and spirit of the invention set forth in the claims.

In summation of the above description, the present invention provides a significant improvement over the conventional techniques and complies with the patent application requirements, and is submitted for review and granting of the commensurate patent rights.

What is claimed is:

1. A redundant power system to provide multiple main output power and multiple standby power to drive a plurality of loads operating in an operating mode or a standby mode, comprising:

a plurality of power supplies to provide respectively a main output power and a standby power; and a back panel including a power bus path to converge the main output power provided by the power supplies, the power bus path being divided into a plurality of main power output paths each controlled by a remote ON/OFF switch to determine whether to perform output and a plurality of standby power output paths each including a conversion unit to convert the power in the power bus path and provide a simulated standby power to the loads in a normal condition.

2. The redundant power system of claim 1, wherein at least one of the power supplies is maintained in the operating mode to provide the main output power.

3. The redundant power system of claim 2 further including a power source control unit to receive the standby power output from the power supplies to determine whether any power supply malfunctions.

4. The redundant power system of claim 3, wherein the power source control unit and each of the power supplies are bridged by a control signal path to output a control signal from the power source control unit to drive the power supply to start providing the main output power.

5. The redundant power system of claim 3, wherein the power source control unit is located on the back panel.

6. The redundant power system of claim 1, wherein the main output power and the simulated standby power have different voltage levels.

* * * * *